United States Patent
Gourlay et al.

[15] 3,666,976
[45] May 30, 1972

[54] FLUID OPERATED ELECTRIC GENERATOR UTILIZING A PIEZOELECTRIC DEVICE

[72] Inventors: Robert D. Gourlay, Canoga Park, Calif.; Hughes Aircraft Company, Culver City, Calif.

[22] Filed: Nov. 10, 1965

[21] Appl. No.: 529,895

[52] U.S. Cl. .............................................. 310/8.8, 310/8.1
[51] Int. Cl. .......................................................... H03k 3/35
[58] Field of Search .......................... 102/70.2; 322/2, 3, 35; 310/8.5, 8.8, 8.1, 8; 307/43; 137/81.5

[56] References Cited

UNITED STATES PATENTS

| | | | |
|---|---|---|---|
| 3,337,758 | 8/1967 | Brothers | 310/8.5 |
| 2,539,535 | 1/1951 | Espenschied | 310/8.1 |
| 3,158,166 | 11/1964 | Warren | 137/81.5 |
| 3,239,678 | 3/1966 | Kolm et al. | 102/70.2 |

Primary Examiner—Richard A. Farley
Assistant Examiner—J. M. Potenza
Attorney—James K. Haskell and Joseph P. Kates

[57] ABSTRACT

A fluid operated electric generator to convert fluid source energy, for example, in a rapidly moving vehicle or projectile to usable electrical power. The generator comprises an acoustic oscillator including an annular nozzle and an acoustically resonant cavity coaxial with the nozzle and spaced therefrom. The resonant cavity comprises a cylindrically shaped pipe having an annular knife edge facing the nozzle. Positioned at the bottom of and forming the end of the cylindrically shaped cavity is a piezoelectric disc. The fluid directed toward the cavity by the nozzle, upon striking the knife edge, produces acoustic oscillations which are stabilized at a single frequency by the resonant cavity and are coupled to the piezoelectric disc. The piezoelectric disc responsive to displacement by the acoustic oscillations provides an electrical signal at the oscillating frequency.

10 Claims, 4 Drawing Figures

INVENTOR.
ROBERT D. GOURLAY,
BY Walter R. Thiel
ATTORNEY.

INVENTOR.
ROBERT D. GOURLAY,
BY
Walter R. Thiel
ATTORNEY.

FLUID OPERATED ELECTRIC GENERATOR UTILIZING A PIEZOELECTRIC DEVICE

This invention relates to an electrical power source and more particularly to an electrical generator having no moving parts which is operated by acoustic oscillations.

Heretofore, vehicles and devices such as projectiles capable of moving through the earth's atmosphere have contained components and systems for storing and delivering or generating the electrical energy necessary to operate the numerous electrical and electronic systems contained in such vehicles and devices. Among such components and systems have been conventional electrochemical storage batteries or reserve cells, thermal batteries, radioactive batteries and rotary electric generators. While such components have proven satisfactory in certain operations, each of them has inherent limitations which make their use impractical for many applications.

The two primary limitations of storage batteries and reserve cells are short life and reductions in performance at the extremes of even a normal range of operating temperatures. The thermal battery which is stored with a solid electrolyte and uses an internal chemical heat source to liquify the electrolyte effectively overcomes the storage and low temperature problems of storage batteries and reserve cells. However, the thermal battery presents its own problems of relatively high costs and the need to thermally protect adjacent components. In addition, these batteries have an activation time that is a significant fraction of its active life.

Solid electrolyte and radioactive batteries offer a long storage life and relatively high voltage but such units are limited to currents in the order of microamperes or less, thus limiting their use for many applications. The air driven rotary generator has received extensive usage and overcome some of the difficulties associated with batteries but includes limitations of its own such as jamming of the propellers or turbines by foreign objects, induced vibration, high cost and weight and difficulty in insulating the bearings from launch forces.

Both reserve cells and thermal batteries require initiation from an external stimulus. While reserve cells are commonly activated directly by the linear acceleration and/or spin forces encountered in the launch of a vehicle or device into the earth's atmosphere, the thermal battery usually requires operation of a pyrotechnic initiator. In both cases unless manually activated it is necessary for the initiating mechanism to discriminate between the forces of handling and delivery in the actual activating force environment.

Therefore, an object of the present invention is to provide an improved electrical power source which has an indefinite storage life, is safer to handle, is capable of delivering electrical power over an extended range of operating temperatures and has a reduced start-up time.

A further object of the improved source of electrical power of the present invention is to provide a fluid operated electrical generator having a minimum of moving parts, a reduction in mass and a reduction in the coupling of generated vibration forces to other components positioned near the generator.

A still further object of the present invention is to provide an improved fluid operated piezoelectric electrical power source including a novel arrangement of a resonant cavity positioned coaxially with the nozzle of an acoustic oscillator.

Briefly, the improved fluid operated electric generator of the present invention comprises an acoustic oscillator including a nozzle and a resonant cavity coaxial with the nozzle and spaced therefrom for producing acoustic oscillations and a source of fluid coupled to the nozzle for producing a jet of fluid directed toward the cavity. A piezoelectric generator is coupled to the resonant cavity and is responsive to the acoustic oscillations to produce electrical energy.

These and other objects and advantages of this invention will become apparent from the following description taken in accordance with the specification and considered in conjunction with the accompanying drawings throughout which like reference characters represent like parts and in which.

Figure 2:
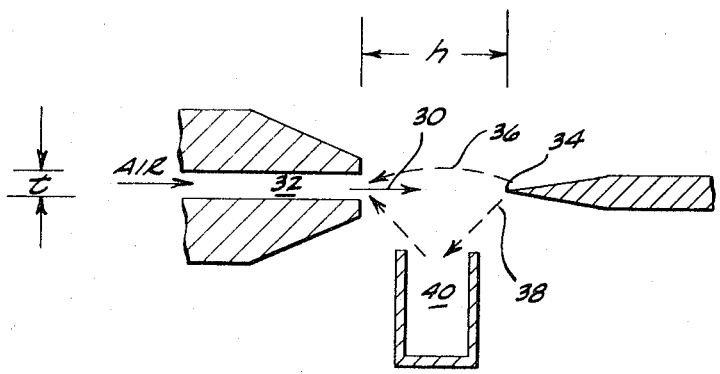
FIG. 2 is a diagrammatic representation in cross section of an acoustic oscillator illustrating the general acoustic principle of an edgetone acoustic oscillator resonator system.
Figure 3:
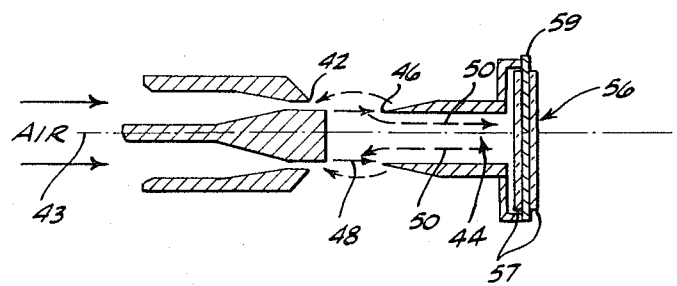
Figure 4:
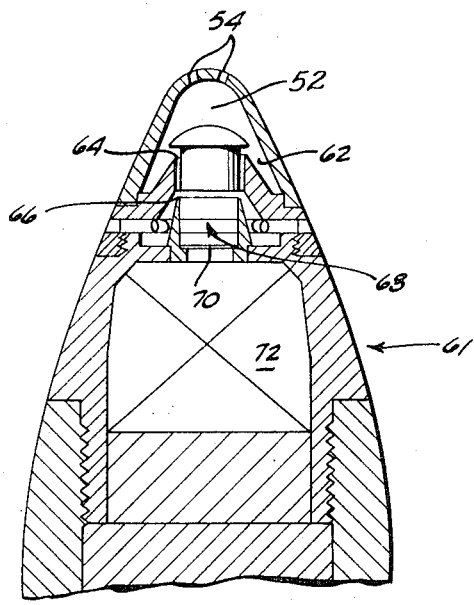

FIG. 3 is a diagrammatical representation in cross section of an acoustic oscillator illustrating the adaptation of the general acoustic principle shown in FIG. 2 to the improved electric power source of the present invention; and FIG. 4 is a sectional view of a portion of the nose of a projectile such as an artillery shell illustrating one application of the principle of the improved electric power source of the present invention.

Figure 1:
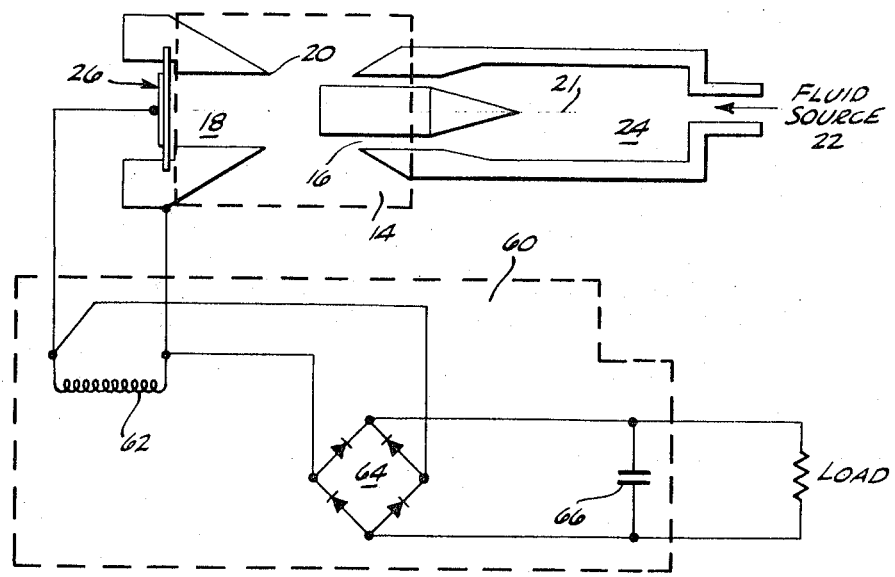
FIG. 1 is a schematic drawing of the improved electric power source of the present invention showing the primary elements of the invention and the relationship of said elements.

Referring now to FIG. 1, the fluid operated electric generator of the present invention is composed of three primary elements. The first element is an acoustic oscillator 14 including an annular nozzle 16 and a resonant cavity or pipe 18 having an extremity or edge 20 shaped in the form of an annular knife edge. The cavity 18 is located coaxially of a central axis 21 of the annular nozzle 16 and is positioned from the nozzle so that the knife edge 20 is spaced a predetermined distance from the mouth of the nozzle to provide acoustic coupling. This acoustic coupling will be described in detail later. The second element is a fluid source 22 which may be a pressure source connected to a plenum chamber or pressure chamber 24 for stabilizing the flow of the source fluid. The third element is a piezoelectric generator 26 forming one end of the resonant cavity 18 and is responsive to the acoustic oscillations for producing electrical energy.

In one embodiment of this invention to be described later the fluid source is the ram air striking the nose of a projectile as it moves through the earth's atmosphere and the pressure of this air is stabilized by porting it into a plenum chamber. While this particular source of operating fluid in combination with a plenum chamber has been shown and described, it should be understood that this is for illustration only since other fluids and sources thereof may be used without varying from the scope of this invention.

The acoustic oscillator 14 is an edgetone or jet-edge oscillator and referring now to FIGS. 2 and 3 in addition to FIG. 1, the following is a brief discussion of this oscillator and its adaptation to the present invention. For a more detailed description reference should be made to the Journal of the Acoustical Society of America, Volume 33, No. 4, pp. 395–409, dated April 1961 and Volume 24, No. 3, pp. 293–304 dated May 1952.

Referring first to FIG. 2, a jet of fluid represented by a solid arrow 30 emerges from a slit nozzle 32 and impinges on a rigid edge or blade 34 resulting in vortices or fluctuations in the fluid stream interacting with the edge 34 and affecting the motion of fluid around the edge thus producing acoustic waves represented by broken arrows 36, 38. The stream leaving the nozzle 32 is acoustically disturbed by the acoustic waves 36, 38 and these disturbances are amplified by instabilities in the fluid stream as it travels to the edge 34. The result is a closed feedback loop between the edge and the nozzle. In the fashion of an electronic oscillator if the loop phase shift is sufficient and the loop gain is unity the system will oscillate in a stable manner.

As stated by Allen Powell in the Proceedings of the Fourth International Convention on Acoustics, Copenhagen 1962, in his article entitled "Nature of Feedback Mechanism in Some Fluid Flows Producing Sound", the phase shift or time delay as the disturbance moves from the jet to the edge is a function of $h$, the distance of the nozzle 32 from the edge 34 and the mean fluid convection velocity between the nozzle and the edge. The convection velocity is a function of $h$ over the width $t$ of the nozzle 32 and the Reynolds number. The returning phase shift (or time delay) between the edge 34 and the nozzle 32 is acoustic and is related to the distance $h$ and the speed of sound in that path. From these relationships it is apparent that for a fixed set of physical dimensions the oscillating frequency will vary with the jet velocity and the speed of sound in the environmental medium.

Again considering the analogy of an electronic oscillator, to maintain a stable oscillation it is necessary for a non-linearity to limit the loop gain to unity. As the jet stream is disturbed there is a cross motion or deflection of the stream which reaches a limiting value dependent upon $h/t$ and the jet velocity. This limiting action provides the non-linearity necessary for amplitude stability. To provide stable single frequency oscillations over a range of jet velocities it is necessary to add an additional element in the feedback loop. This element is a frequency sensitive device such as a quarter wave closed end resonant cavity or pipe 40. The pipe 40 forms an additional feedback path between the edge 34 and the nozzle 32. The coupling by means of this tuned loop is considerably greater than the direct coupling as discussed above and its effect is to stabilize the oscillations near the resonant frequency of the pipe and at an appreciably higher amplitude.

The jet-edge oscillator system shown in FIG. 2 includes a planar nozzle and edge and the principles applicable thereto are likewise applicable to the acoustic oscillator system shown in FIG. 3. This oscillator includes an annular nozzle 42 and a resonant pipe 44 positioned coaxially with a central axis 43 of the nozzle 42 and has an outer edge or extremity 46 shaped to function as the knife edge. Because of the annular nature of the jet of air shown as a solid arrow 48 the air stream is caused to swell and contract rather than deflect as in the jet-edge oscillator of FIG. 2. The symmetry of action results in the acoustic oscillations shown as the broken arrows 50 being oriented along the central axis 43 resulting in effective coupling to the resonant pipe 44.

Referring again to FIG. 1, the chamber 24 is adaptable to the functions of collecting, filtering, cooling and regulating the input air. The particular configuration of the air source 22 and the chamber 24 is dependent on the velocity of the particular vehicle or device considered and the electric output power of the generator. As illustrated in FIG. 4, the air source in the case of an artillery projectile is the air plenum chamber 52 located at the nose of the projectile to receive, through input ports 54 the ram air.

The primary considerations in selecting the piezoelectric generator 26 is the need to minimize the impedance mismatch with the air column of the resonant cavity 18, since in the preferred embodiment the generator is positioned at the end of the resonant cavity 18. Shown best in FIG. 3 a laminated element 56 formed of two piezoelectric ceramic discs 57 on a metal disc 59 is one form of a piezoelectric element that has proved satisfactory, however, this invention is not so limited. Such an element may be fabricated by bonding one or two piezoelectric discs on a brass or beryllium copper disc with a silver filled epoxy cement. For example shown in FIG. 1 is a single disc form and in FIG. 3 a double disc form. The piezoelectric element 56 shown in FIG. 3 has a diameter larger than the diameter of the pipe 44. This pipe diameter is smaller than a wavelength of sound to prevent cross modes of oscillation while the diameter of the element 56 is large enough to be mechanically resonant at the system operating frequency.

The choice of the piezoelectric material requires consideration of several interrelated parameters. Among these are the electromechanical coupling coefficient, dielectric constant, piezoelectric constant, frequency constant, mechanical Q, and the depolarization level. Each of these parameters has an effect on the selection of the proper material and it has been found that several lead zirconate-titanate crystal materials met these parameter requirements. Such commercial materials are Type HST-41, manufactured by Gulton Industries, Inc., Metuchen, N.J., and Clevite Type PZT-5, manufactured by Piezoelectric Division of Clevite Corporation, Bedford, Ohio.

To optimize the electrical output of the generator of the present invention, and to couple this output to a load circuit, a resonant output circuit 60 such as that shown in FIG. 1 may be electrically coupled to the piezoelectric generator 18. Typically, such a circuit may comprise an inductor 62 such as the primary of a transformer, a conventional diode rectifier circuit 64 and a filter capacitor 66.

Referring to FIG. 4, the above discussed principles are shown in their application to an electric power source adapted for furnishing power to the electrical systems of a projectile such as an artillery shell 61. While this invention is shown as applicable to uses in artillery shells, it should be understood that this is by way of illustration only and that the principles of this invention may be applied to other vehicles and devices where there is relative movement between the device and a fluid medium without varying from the scope and teaching of this invention. In this embodiment the fluid source includes the pair of inlet ports 54, the air plenum chamber 52, and a water pocket 62 and the acoustic oscillator comprises an annular nozzle 64, a knife edge 66 and a resonant cavity 68. A piezoelectric element 70 forms a disc at the bottom of the resonant cavity 68 and is electrically connected to a load 72 such as an electrical fuze actuation circuit positioned inwardly of the piezoelectric element through a conventional electrical conductor (not shown). As discussed above, this electrical circuit typically contains an inductor, rectifier, and filter capacitor.

Basically this generator operates in the following manner. The pressure in the plenum 52 produced by the ram air entering the inlet ports 54 as the projectile passes through the air forces a jet of air through the annular nozzle 64. The jet of air strikes the knife edge 66 and excites the resonant cavity 68. This action results in an acoustic oscillation. The resultant pressure fluctuations from the acoustic oscillations are coupled to the piezoelectric element through the resonant cavity thereby stressing the piezoelectric element in a cyclic manner to produce an alternating electrical output voltage. The resulting current is rectified, filtered and supplied to the electronic fuze actuation circuit.

While only one embodiment of this invention has been illustrated and described, it will be appreciated by those skilled in the art that variations in this embodiment both as to its details and as to the organization of such details may be made without departing from the spirit and scope thereof. Accordingly, it is intended that the foregoing disclosure of a preferred embodiment will be considered only as illustrative of the principles of the invention as described herein and will not be considered in a limiting sense.

What is claimed is:

1. A fluid operated electric generator comprising:
   first means including a nozzle and an acoustically resonant cavity positioned coaxially of the nozzle and spaced therefrom for producing acoustic oscillations;
   second means coupled to said nozzle for producing a jet of fluid; and
   third means coacting with said resonant cavity and responsive to the acoustic oscillations for producing electrical energy.

2. The fluid operated electric generator of claim 1 wherein the first means is an acoustic oscillator including a nozzle having a central axis and a resonant cavity positioned coaxially with said central axis and spaced a predetermined distance from said nozzle.

3. The fluid operated electric generator of claim 2 wherein the nozzle is annular in shape and the resonant cavity includes an annular knife edge.

4. The fluid operated electric generator of claim 1 wherein the first means is an acoustic oscillator including an annular nozzle having a central axis and a resonant cavity positioned coaxially with said central axis and having an annular knife edge spaced a predetermined distance from said nozzle and the second means is a source of fluid coupled to said nozzle for producing a jet of fluid directed to strike said knife edge and excite said resonant cavity to generate acoustic oscillations.

5. The fluid operated electric generator of claim 1 wherein the third means is a piezoelectric generator.

6. The fluid operated electric generator of claim 5 wherein the piezoelectric generator is a disc of piezoelectric material and cooperates with said resonant cavity to close one end thereof.

7. The fluid operated electric generator of claim 1 wherein the first means is an acoustic oscillator including an annular nozzle having a central axis and a resonant cavity positioned coaxially with said central axis and having an annular knife edge spaced a predetermined distance from said nozzle and the second means is a source of fluid coupled to said nozzle for producing a jet of fluid directed to strike said knife edge and excite said resonant cavity to generate acoustic oscillations and said third means is a disc of piezoelectric material cooperating with said resonant cavity to close one end thereof, said disc of piezoelectric material being responsive to said acoustic oscillations for generating an alternating electrical signal.

8. A source of electric power comprising:
an acoustic oscillator including an annular nozzle having a central axis and a resonant cavity positioned coaxially with said central axis having an annular knife edge spaced at a predetermined distance from said nozzle;
a source of fluid coupled to said nozzle for producing a jet of fluid directed to strike said knife edge and excite said resonant cavity to generate acoustic oscillations;
a piezoelectric element in said resonant cavity and responsive to said acoustic oscillations for generating an alternating electrical output signal; and
an electrical resonant circuit coupled to said piezoelectric element for resonating the capacitance of said piezoelectric element and enhancing the electrical signal generated by said element.

9. The source of electric power of claim 8 wherein the piezoelectric element has a disc shape and cooperates with said resonant cavity to close one end thereof.

10. The source of electric power of claim 8 wherein the source of fluid includes means for stabilizing cooling and filtering said fluid.

* * * * *